United States Patent [19]
Carratt et al.

[11] Patent Number: 5,590,233
[45] Date of Patent: Dec. 31, 1996

[54] OPTICAL FIBER CABLE AND AN ASSOCIATED METHOD OF MANUFACTURE

[75] Inventors: Michel Carratt, Houilles; Michel de Vecchis, Vaureal, both of France

[73] Assignee: Alcatel Cable, Clichy Cedex, France

[21] Appl. No.: 285,287

[22] Filed: Aug. 3, 1994

[30] Foreign Application Priority Data

Aug. 4, 1993 [FR] France ................................. 93 09615

[51] Int. Cl.⁶ ........................................................ G02B 6/44
[52] U.S. Cl. ....................................................... 385/100
[58] Field of Search .................................. 385/100–102, 385/105, 109, 113, 141, 31, 901; 362/32, 806, 293, 346; 174/23 C, 70 R, 106 D, 110 SR

[56] References Cited

U.S. PATENT DOCUMENTS

| | | | |
|---|---|---|---|
| 3,775,075 | 11/1973 | Keck et al. | 65/3 |
| 4,844,575 | 7/1989 | Kinard et al. | 385/100 |
| 5,021,928 | 6/1991 | Daniel | 362/32 |
| 5,183,323 | 2/1993 | Daniel | 362/32 |

FOREIGN PATENT DOCUMENTS

| | | |
|---|---|---|
| 0245752A2 | 11/1987 | European Pat. Off. . |
| 0432931A1 | 6/1991 | European Pat. Off. . |
| 2109581 | 6/1983 | United Kingdom . |

OTHER PUBLICATIONS

"Microbending Losses for Weakly Guiding Single–Mode Fibers", *IEEE Journal of Quantam Electronics*, vol. 28, No. 6, Jun. 6, 1992, pp. 1429–1434.

*Primary Examiner*—Akm E. Ullah
*Attorney, Agent, or Firm*—Sughrue, Mion, Zinn, Macpeak & Seas

[57] ABSTRACT

The present invention relates to an optical fiber cable, in particular for a distribution network, and comprising an assembly of optical fibers, wherein each of the optical fibers has a mode field diameter lying in the range 7 μm to 9 μm at around 1550 nm, and a cutoff wavelength less than or equal to 1.35 μm, and wherein the optical fibers are assembled together in the cable by being twisted around one another or around a reinforcing element, or by being disposed lengthwise.

13 Claims, 2 Drawing Sheets

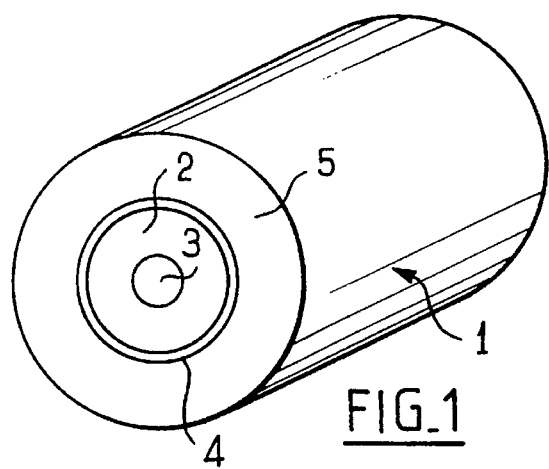
FIG_1
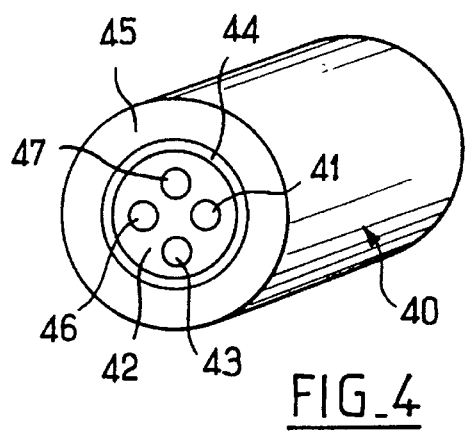
FIG_4
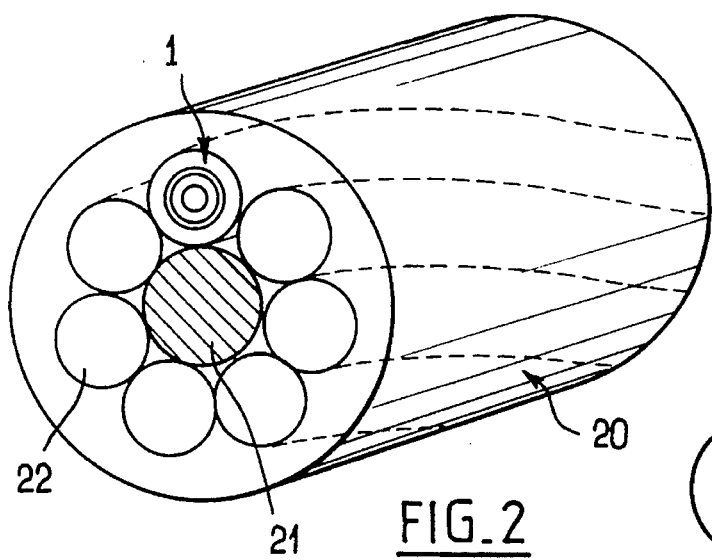
FIG_2
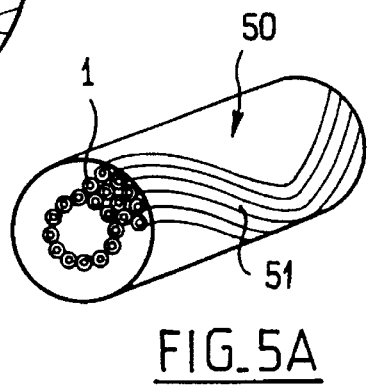
FIG_5A
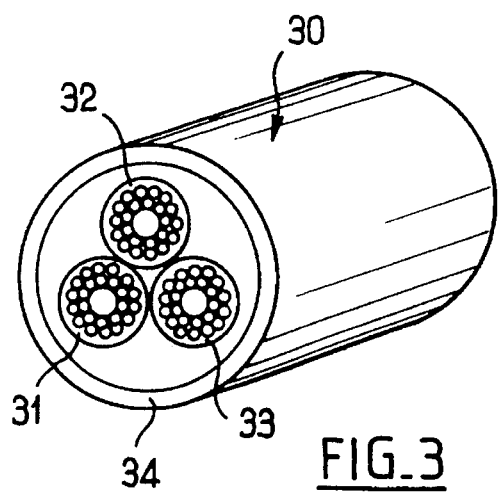
FIG_3
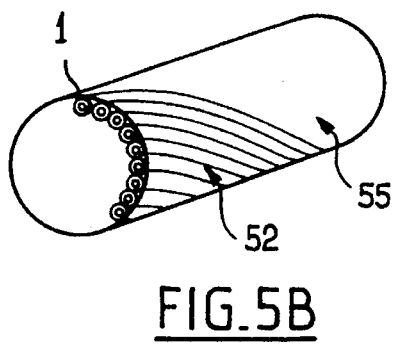
FIG_5B

OPTICAL FIBER CABLE AND AN ASSOCIATED METHOD OF MANUFACTURE

The present invention relates to an optical fiber cable, in particular for a distribution network. It also relates to an associated method of manufacture.

BACKGROUND OF THE INVENTION

Optical fiber cables enable data to be transmitted under excellent conditions and over ever increasing distances.

Until now, use thereof has been mainly restricted to long-distance transmission, in inter-city and inter-exchange networks. At present, attention is being paid to using them in distribution networks, and even within buildings and residential areas, particularly in the context of developing integrated services digital networks (ISDN).

Unfortunately, conventional optical fiber cable structures are adapted to inter-city and inter-exchange networks and are more suitable for fibers in small to medium numbers, whereas an optical fiber cable for a distribution network needs to have a much larger number of optical fibers than is required for long distance transmission, since it is necessary to take account of a multiplicity of subscriber terminations (in practice, the number of optical fibers in such a cable may lie in the range a few hundreds to a few thousands), yet the cable must nevertheless be sufficiently compact to enable it to be installed in ducts of very small diameter.

Optical fiber cables presently in use for long distance transmission are of two types.

A first type of optical fiber cable is of a structure that is "cellular" or "free", i.e. it includes one or more elements in the form of a grooved rod or in the form of a tube in which optical fibers are housed. In order to reduce the bending and microbending to which the optical fibers are subjected, and which give rise to increases in attenuation, the optical fibers are left free and a certain amount of excess length is provided within the grooves or the tube.

It will readily be understood that in order to leave room to take up the excess lengths of the fibers, such a structure requires a very large ratio between the section of the cable as a whole and the sum of the sections of the individual optical fibers included therein. A structure of that kind is therefore quite unsuitable for use in a distribution network since cable sections would then be prohibitive, given the very large number of optical fibers that a cable must contain in order to be used in such a network.

A second type of optical fiber cable has a "ribbon" structure, i.e. the optical fibers are disposed parallel to one another and they are held together by a protective coating of resin. Cables of that type are more compact and less bulky, since there is no need to provide for excess lengths of fiber. Nevertheless, the ribbon structure is better adapted to connection of all the fibers simultaneously and that can give rise to problems in a distribution network. In a distribution network, it is necessary to provide for continuous evolution in the topology of the network, and that requires a ribbon to be split up, which operation is difficult to make compatible with the constraints of simultaneous connection since it does not provide sufficient flexibility.

Thus, it can be seen from presently existing optical fiber cable techniques that they are ill-suited to use within a distribution network.

OBJECT AND SUMMARY OF THE INVENTION

The object of the present invention is to remedy those drawbacks by proposing an optical fiber cable that satisfies the constraints inherent to use within a distribution network, that is capable of being produced at low cost, that provides ease of connection, and that is capable of including a large number of fibers.

To this end, the present invention provides an optical fiber cable comprising a plurality of optical fibers, each fiber having an optical core surrounded by optical cladding, each of said optical fibers being provided over said optical cladding with a substantially hermetic coating and including over said hermetic coating a coating of plastics material, said cable further including an outer protective sheath of plastics material surrounding said optical fibers, wherein each of said optical fibers has a mode field diameter lying in the range 7 µm to 9 µm at around 1550 nm, and a cutoff wavelength that is less than or equal to 1.35 µm, and wherein said optical fibers are assembled together in said cable by being twisted around one another or around a reinforcing element, or by being disposed lengthwise.

Thus, with a capable of the invention, it is possible to use procedures for organizing connections that are as close as possible to those that have and that continue to prove their worth in distribution by means of copper wire electric cable, i.e. the optical fibers are twisted about each other or about a central reinforcing member, or else they are disposed lengthwise, particularly in a tight structure, with this being made possible by reducing the sensitivity of the optical fibers to bends and to microbends.

It is known that optical fibers subjected to bends and microbends suffer from penalties of reduced lifetime and of increased transmission losses due to an increase in attenuation.

By providing the optical fibers with a thin hermetic coating (thus not significantly increasing the bulk thereof), their lifetime is increased and so the first penalty of bends and microbends is avoided.

By choosing a mode field diameter in the range 7 µm to 9 µm at around 1550 nm, and a cutoff wavelength for each of the optical fibers that is less than or equal to 1.35 µm, improved transmission is ensured, i.e. losses are reduced, thereby avoiding the second penalty of bends and microbends.

The sensitivity of optical fibers to bends and microbends is thus reduced, thereby avoiding the need to use excess lengths and free structures. It is thus possible to use optical fibers in structures of the same type as those used for electrical distribution cables, thereby achieving a high degree of compactness compared with free structure optical fiber cables, while nevertheless making connections easy compared with ribbon optical fiber cables.

Thus, because of the invention, the effects of bends and microbends are reduced not by resorting to structures of large diameter or of ribbon structure, but by acting directly on the optical fibers. The combination of a novel optical fiber structure and a cable structure of the same type as that which is used for electrical distribution, as made possible by the increased ability of the optical fiber to withstand bends and microbends, makes it possible to implement a cable that is particularly compact and adapted to use in distribution networks, to the same extent as are electrical cables having the same structure.

Finally, the effect of implementing a plastics coating around each optical fiber is firstly to protect its surface treatment and secondly, while the coating is being extruded, to enable the fiber coated in this way to be identified since the number of available color combinations is greater (as in an electrical cable) than when coloring a primary fiber coating in the form of a resin. The problem of identifying and finding each fiber within a cable is thus solved, and this is of crucial importance during installation and connection. This problem is also properly solved with conventional wire transmission, but in previously known optical fiber cables the number of colors that could be used for the primary resin coating of the fibers has been relatively limited.

It may be observed that extrusion of the coating of plastics material on the optical fiber is possible because the fiber has been made less sensitive to bending and to microbending.

The choice of a thin plastics coating also makes it possible to limit the amount of bending or microbending that is applied to the fiber.

In another aspect, the invention provides a method of manufacturing an optical fiber cable, comprising the following steps:

making optical fibers having a mode field diameter lying in the range 7 μm to 9 μm at around 1550 nm, and a cutoff wavelength that is less than or equal to 1.35 μm;

treating each fiber to make it substantially hermetic;

making a thin plastics coating that is colored for identification purposes and that is applied directly on each previously-treated fiber;

assembling the fibers that have been treated and coated in this way; and applying a sheath to the assembly.

BRIEF DESCRIPTION OF THE DRAWINGS

In the accompanying drawings given by way of non-limiting example:

FIG. 1 is a perspective view of an optical fiber treated in accordance with the invention;

FIG. 2 is a perspective view of fibers of the invention assembled together in concentric layers;

FIG. 3 is a perspective view of fibers of the invention assembled together in bundles;

FIG. 4 is a perspective view of a multi-core fiber capable of being used in place of the fiber of FIG. 1;

FIG. 5A shows fibers assembled together using an SZ method of assembly;

FIG. 5B shows fibers assembled together using a helical pitch method of assembly.

In all of the figures, common elements are given the same reference numerals.

MORE DETAILED DESCRIPTION

An optical fiber cable of the invention is described below with reference to FIGS. 1 to 5B.

An optical fiber cable of the invention may present a combination of all or some of the following features:

the cable has a small mode field diameter lying in the range about 7 μm to 9 μm for a wavelength close to 1550 nm, so as to withstand bending and microbending, which corresponds to an index profile that is easy to make, e.g. $\Delta n=6\times 10^{-3}$ to $8\times 10^{-3}$;

treatment is performed on or in the outer silica layer to obtain adequate lifetime under difficult conditions: the fiber then becomes a "hermetic" type fiber;

a thin plastics coating is applied directly on the fiber made in this way (by extrusion or by some other coating process) and it is colored for identification purposes.

Figure 6:
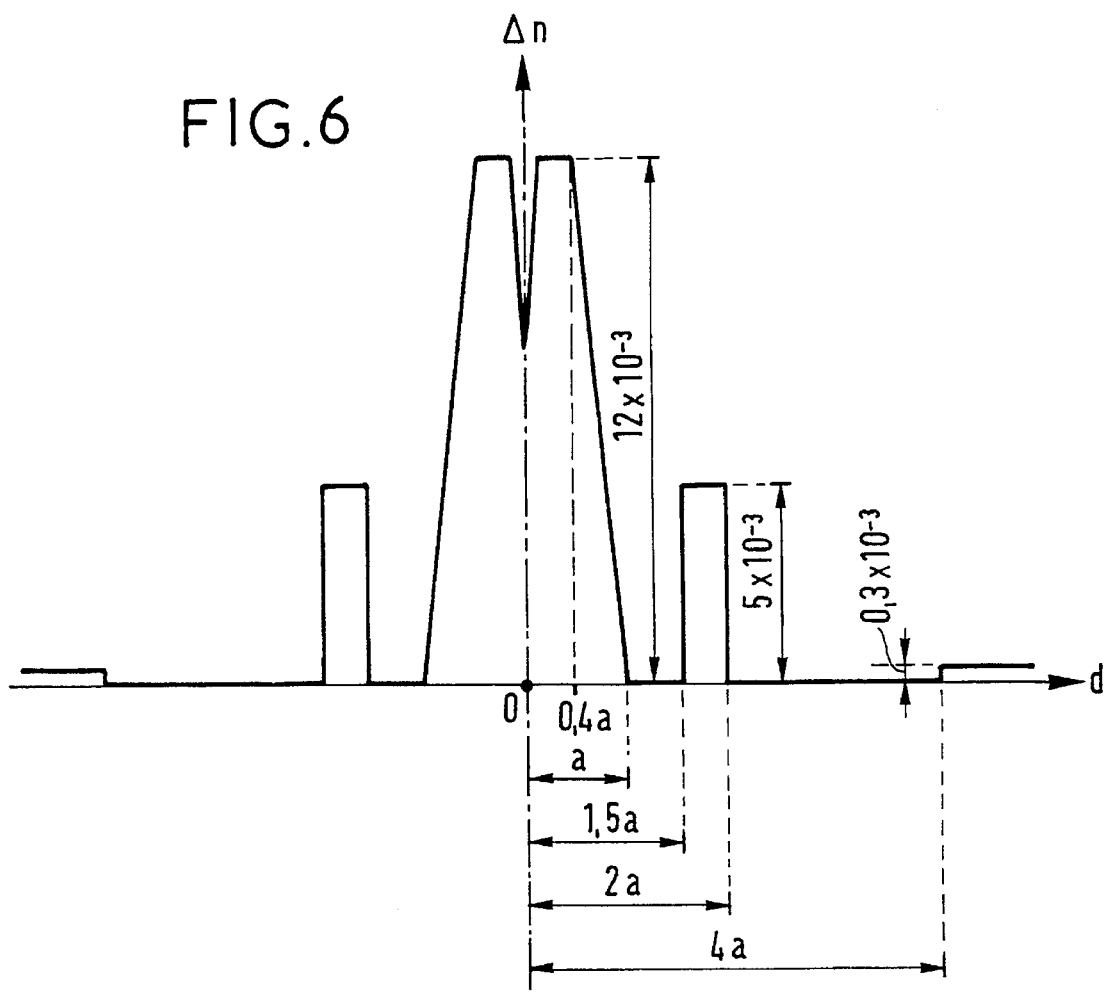
FIGS. 6 and 7 comprise two examples of index profiles for the fibers used in a cable of the invention.
Figure 7:
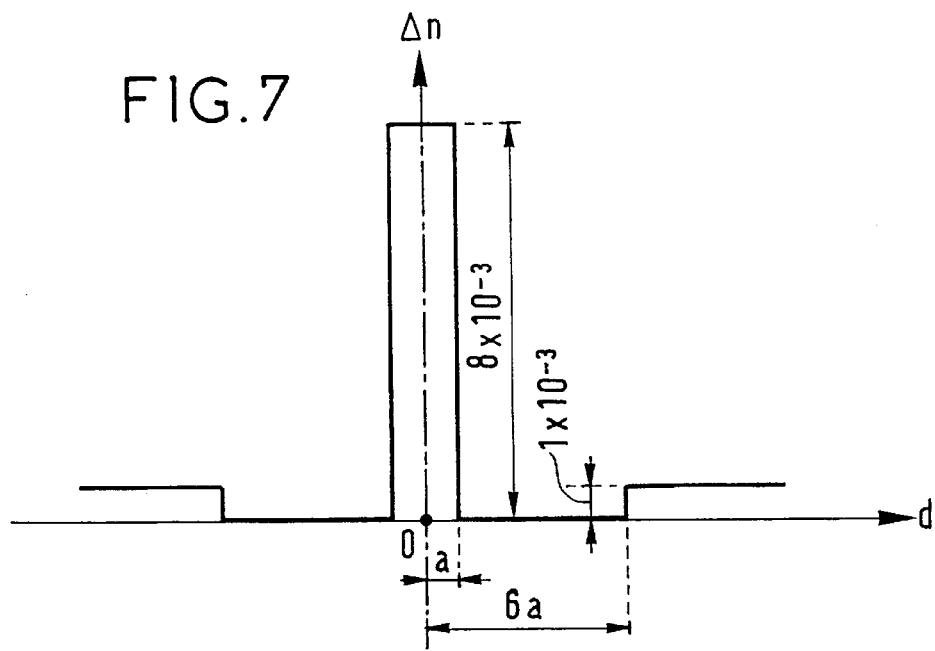

More generally, at around 1550 nm, the mode field diameter of fibers of the invention lies in the range 7 μm to 9 μm, and the cutoff wavelength of each of the fibers is less than or equal to 1.35 μm, and is preferably about 1.33 μm. Two non-limiting examples of index profiles enabling the above feature to be obtained are shown in FIGS. 6 and 7, in which the differences $\Delta n$ between the refractive indices of the various portions of the optical fiber and of the cladding immediately surrounding the core are given as a function of distance d from the axis of the fiber, where a is the radius of the core of the optical fiber.

With reference to FIG. 1, an optical fiber 1 used in a cable of the invention has silica optical cladding 2 that conventionally surrounds the propagation optical core 3. The cladding is initially subjected to treatment 4 that may be constituted by surface treatment, e.g. based on titanium oxide or on adding a coating layer of carbon, for example, said treatment being designed to increase the lifetime of the fiber. The above coating is very thin, being about 0.5 μm thick, for example.

All of the silica layers that may surround the optical core are referred to as the "optical cladding" and they are given an overall reference numeral 2 in order to simplify the description. However, it will naturally be understood that the optical cladding may be complex (in particular as shown in FIGS. 6 and 7) in order to obtain desired properties, and the cladding is not necessarily constituted by a single layer of silica around the optical core.

A plastics coating 5 is formed on the previously treated fiber. The function of the coating 5 is to protect the treatment 4. It also serves to contribute to identifying different fibers within a cable by means of color codes. Identification is of great importance for cables implemented in a distribution network. The coating is preferably provided by extrusion so as to maximize the number of color combinations that can be provided, but it could be provided by some other coating process.

Fibers treated and coated in this way are then assembled together, as can be seen in FIGS. 2 and 3.

A first method of assembly that is well known in the field of electrical cables is that of concentric layers, and it is shown in FIG. 2. In this mode of assembly, the fibers 1, 22 are disposed helically (or twisted) within a cable 20 in regular concentric layers, e.g. around a mechanical reinforcing element 21 that may be made of a packing material. The reinforcing element 21 may be replaced by an optical fiber.

In another mode of assembly in accordance with the invention, as shown in FIG. 3, the fibers are disposed within a cable 30 in bundles 31, 32, 33, with each bundle itself being made up in various different ways, lengthwise or in concentric layers. The assembly is protected by an outer sheath 34 of plastics material.

It is also possible to envisage replacing the optical fibers described above with "multi-core" fibers that have the same characteristics in terms of mode field diameter as the optical fiber 1 in FIG. 1, but that constitute an optical quad, for example, with FIG. 4 being a simplified illustration showing the structure of a fiber 40 comprising four cores 43, 45, 46, and 47, treatment 44, and a plastics coating 45.

To improve the mechanical quality of the cable, the fibers or the bundles of fibers are conventionally twisted along the length of the cable, either in compliance with a helical assembly mode 52 as shown in FIG. 5B that illustrates a cable 55 comprising fibers 1 treated in accordance with the invention, or else in compliance with an SZ type assembly mode 51 as shown in FIG. 5A which illustrates a cable 50 comprising fibers 1 treated in accordance with the invention.

However, and still within the invention, the optical fibers may be assembled in a structure that is tight or loose, and lengthwise, optionally around a central reinforcing element.

After the fibers have been assembled as described above, the assembly is protected by an outer sheath of plastics material as shown in FIG. 3. Given the characteristics of such a cable (small diameter and light weight relative to the number of fibers) and since the major fraction of the right cross-section is made up of fibers that withstand stresses, it may be pointless to add any mechanical reinforcement, thus constituting an additional advantage for the cable of the invention.

The plastics coating made on the treated fiber, either by extrusion or by some other coating process must be as thin as possible in order to minimize bulk and increase the number of fibers within a cable of given diameter. The plastics coating performs two functions, namely that of protecting the treatment performed on the outer layer of silica of the fiber, and that of identification by means of an appropriate color code. This identification function is essential for cables used in a distribution network. The technique of coating by extrusion makes it easy to implement marking by color coding the plastics coating. It should be observed that the technique of coating by means of a resin is less well adapted to providing identification by multiple color codes.

As an example of a particular embodiment, the following dimensions may be mentioned:

diameter of the fiber 1 over the optical cladding 2: 125 µm±3 µm;

thickness of the carbon coating 4: 0.5 µm;

thickness of the plastics coating 5 of the fiber: about 200 µm;

mode field diameter $2W_0$ at 1550 nm: $7.5 \text{ µm} \leq 2W_0 \leq 9$ µm; and cutoff wavelength $\lambda_c$: $1200 \text{ nm} \leq \lambda_c \leq 1280 \text{ nm}$ ($\lambda_c$ is always less than or equal to 1350 nm).

Naturally the invention is not limited to the examples described above, and numerous modifications can be applied to said examples without going beyond the ambit of the invention.

Thus, it is possible for the outside diameter of the silica fiber to be around 80 µm to 100 µm, and various different types of treatment may be applied to the outer surface of the silica layer.

Similarly, the number of fibers within a cable and the way in which they are assembled together can be arbitrary and may depend, in particular, on the conditions under which the cable is used.

We claim:

1. An optical fiber cable comprising:

a plurality of optical fibers, each fiber having an optical core surrounded by optical cladding, each of said optical fibers being provided over said optical cladding with a substantially hermetic coating and including over said hermetic coating a coating of plastics material;

said cable further including an outer protective sheath of plastics material surrounding said optical fibers;

wherein each of said optical fibers has a mode field diameter lying in the range 7 µm to 9 µm at around 1550 nm, and a cutoff wavelength that is less than or equal to 1.35 µm, and wherein said optical fibers are assembled together in said cable by being twisted around one another.

2. A cable according to claim 1, wherein said plastics coating includes identification information for identifying each fiber.

3. A cable according to claim 2, wherein said identification information corresponds to a color code.

4. A cable according to claim 1, wherein the optical fibers are assembled together in bundles.

5. A cable according to claim 1, wherein the optical fibers are assembled together in concentric layers.

6. A cable according to claim 1, wherein optical fibers are assembled together in a helical pitch.

7. A cable according to claim 1, wherein the optical fibers are assembled together in an SZ type assembly pitch.

8. A cable according to claim 1, wherein the optical fibers are multi-core fibers.

9. A cable according to claim 1, wherein said hermetic coating of each fiber comprises a deposit of carbon on the optical cladding.

10. A cable according to claim 1, wherein said hermetic coating of each fiber comprises titanium oxide based doping of said optical cladding.

11. A method of making an optical fiber cable according to claim 1, comprising the following steps:

making optical fibers having a mode field diameter lying in the range 7 µm to 9 µm at around 1550 nm, and a cutoff wavelength that is less than or equal to 1.35 µm;

treating each fiber to make it substantially hermetic;

making a thin plastics coating that is applied directly on each previously-treated fiber;

assembling the fibers that have been treated and coated in this way; and applying a sheath to the assembly.

12. An optical fiber cable comprising:

a plurality of optical fibers, each fiber having an optical core surrounded by optical cladding, each of said optical fibers being provided over said optical cladding with a substantially hermetic coating and including over said hermetic coating a coating of plastics material;

said cable further including an outer protective sheath of plastics material surrounding said optical fibers;

wherein each of said optical fibers has a mode field diameter lying in the range 7 µm to 9 µm at around 1550 nm, and a cutoff wavelength that is less than or equal to 1.35 µm, and wherein said optical fibers are assembled together in said cable by being twisted around a reinforcing element.

13. An optical fiber cable comprising:

a plurality of optical fibers, each fiber having an optical core surrounded by optical cladding, each of said optical fibers being provided over said optical cladding with a substantially hermetic coating and including over said hermetic coating a coating of plastics material;

said cable further including an outer protective sheath of plastics material surrounding said optical fibers;

wherein each of said optical fibers has a mode field diameter lying in the range 7 µm to 9 µm at around 1550 nm, and a cutoff wavelength that is less than or equal to 1.35 µm, and wherein said optical fibers are assembled together in said cable by being disposed lengthwise.

* * * * *